Dec. 15, 1942.  H. G. LUBSZYNSKI  2,305,179
ELECTRON MULTIPLIER
Filed May 24, 1939
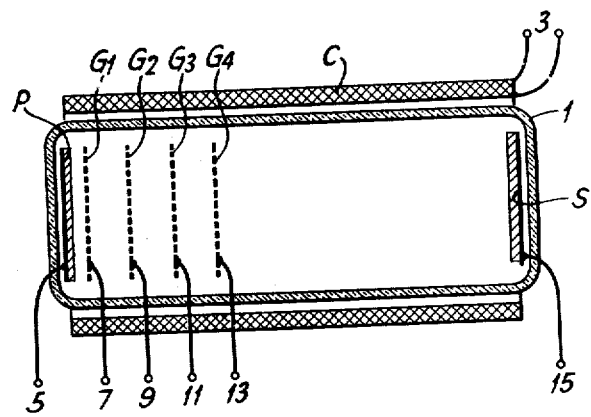
INVENTOR.
HANS GERHARD LUBSZYNSKI
BY
ATTORNEY.

Patented Dec. 15, 1942

2,305,179

UNITED STATES PATENT OFFICE 2,305,179

ELECTRON MULTIPLIER

Hans Gerhard Lubszynski, Hillingdon, England, assignor to Electric & Musical Industries Limited, Hayes, Middlesex, England, a company of Great Britain Application May 24, 1939, Serial No. 275,402
In Great Britain May 27, 1938

3 Claims. (Cl. 250—175)

This invention relates to electron multipliers of the so-called picture type, that is to say, a multiplier in which an image of an object is projected onto an electron-emitting surface and the primary electrons emitted from such surface are focused onto a secondary emitting-electrode causing the emission of a greater number of secondary electrons than incident primary electrons so that, in effect, the picture is amplified. Any suitable number of amplifying stages may be employed and the resultant amplified image may be focused onto a viewing screen or onto a suitable form of mosaic screen which may be scanned to generate signals suitable, for example, for television transmission, or, alternatively, the electron image may be utilised in other ways, such as in the manner of the so-called image dissector.

In the form of picture multiplier where the secondary-emitting electrodes are in the form of grids, as described in the specification of U. S. application No. 82,300, which issued as U. S. Patent 2,227,097 on December 31, 1940, it is found that the amplified image is considerably blurred. This is due to the fact that some of the primary electrons are not intercepted by a grid and are consequently out of focus in the plane of the next grid or in the plane of the final screen.

It is the object of the present invention to provide an improved electron multiplier of the picture type with a view to avoiding or reducing this disadvantage.

It is known that when electrons are focused by a magnetic focusing coil generating a substantially homogeneous axially symmetrical magnetic field, the electrons follow helical paths and when the electrons have described one complete revolution they are in a focused condition. In a magnetic field the electrons may traverse several foci and providing a focal point is in the plane of an electrode the electrons will effectively be in focus at the plane. It has been found possible in electron picture multipliers that by so choosing the strength of the magnetic field the potential differences between the electrodes of the device and the relative distances of the electrodes, the electrons which are not intercepted by one grid can be brought into focus on the next grid after describing integral numbers of revolutions whereby the disadvantage resulting from a blurred background mentioned above can be reduced.

According to the invention an electron picture multiplier arrangement of the grid type is provided in which the primary and secondary electrons are focussed by a homogeneous magnetic field acting over substantially the entire length of the multiplier and in which the field strength of the magnetic field, the potential differences between the electrodes of the multiplier and the distances between the cathode and multiplying grid or grids and the final screen are so chosen that the primary electrons which are not intercepted by the first secondary-emitting grid impinge on the next grid or screen after describing integral numbers of revolutions so that they are effectively in focus on the said next grid or screen.

In this manner the secondary electron image on the second grid and the unintercepted primary electrons on the second grid can be maintained in focus thus obtaining a final image which is substantially free from a blurred background. The invention may be applied to successive stages of picture multiplication but in most cases it will not be found necessary to re-focus the primary electrons over more than two stages of amplification since the secondary electron current will by then be so large compared with the unintercepted primary current that the latter will be negligible.

In order that the invention may be clearly understood and readily carried into effect it will now be more fully described with reference to the accompanying drawing which illustrates diagrammatically one form of picture multiplier in accordance with the invention.

As shown, the device comprises an evacuated envelope having an electron-emitting cathode P, four multiplying grid electrodes, $G_1$, $G_2$, $G_3$, $G_4$ and a final screen S which may be a screen adapted to be rendered luminous under the impact of electrons, a mosaic screen or any other suitable form of image-utilising screen. Surrounding the envelope of the device is a magnetic focusing coil C extending along the whole length of the envelope and generating a homogenous axially symmetrical focusing field. In accordance with the invention the field strength of the coil, the potential difference between the electrodes P, $G_1$, $G_2$, $G_3$, $G_4$ and S and the distances between the various electrodes are chosen so that primary electrons released from the cathode P are brought to focus on the electrode $G_1$, those electrons which are not intercepted by the grid $G_1$ are brought to focus on the grid $G_2$, the secondary electrons released from the electrode $G_1$ are brought to focus on the grid $G_2$, the secondary electrons from the grid $G_1$ which are not intercepted by the grid $G_2$ are brought to a focus on the grid $G_3$, and so on.

For the purpose of determining the relative values of the potentials to be applied to the electrodes and the spacing between the electrodes to an elementary approximation the following formulae have been derived.

The ratio of the potential differences between successive electrodes of the group P, $G_1$, $G_2$, $G_3$, $G_4$ and S is derived from the formula $$\frac{\Delta V}{\Delta U} = \frac{4}{\left(\frac{q}{p} - \frac{p}{q}\right)^2} \qquad (1)$$

where $\Delta V$ is the potential difference in volts between the two adjacent electrodes, $\Delta U$ is the potential difference in volts between the preceding electrode and the first of said adjacent electrodes, $p$ is any positive integer, and $q$ is any integer greater than $p$ except in the case of the first stage. Although it is preferable for $p$ and $q$ to be integers, satisfactory results may be obtained, with perhaps a slight loss in definition, where $p$ and $q$ are not integers but vary therefrom to an extent about $\pm 0.3$.

In the physical aspect of this formula $p-1$ is the number of focal planes lying between a pair of adjacent electrodes for those electrons emanating from said preceding electrode and not impinging on the first of the adjacent electrodes and $q-1$ is the number of focal planes lying between the said pair of adjacent electrodes for those electrons emanating from said first electrode.

The spacing $\Delta x$ in centimetres between two adjacent electrodes is derived from the following formula:

$$\frac{10.6q\sqrt{\Delta V}}{H} \quad (2)$$

where $q$ is the integer aforesaid, $\Delta V$ is the aforesaid potential difference and $H$ is the field strength in Gauss of the magnetic focusing field.

As the secondary emission curves of most materials show a definite maximum, the aim is to keep the voltages/stage more or less constant at values which correspond to the maximum of the curve. Furthermore, as the stages distance $\Delta x$ increases with $p$ it will be advantageous to choose $p$ as small as possible, i. e., $p=1$. The product of the values of the voltage ratio for $q=2$ and $q=3$ is then $1.78 \times 0.56 = 1$. Therefore, for alternate stages $q=2$ and $q=3$ may be chosen.

In the last stage there should be a large potential difference in order to make the electrons strike the screen at a high velocity. This could either be achieved by making $p$ large, for instance, $p=3$; $q=4$; then the stage distance would, however, become rather large. For the high voltage employed in the last stage the chromatic aberration would, however, remain fairly small without focusing if only the distance could be made small enough. This would at the same time reduce the overall length of the system and simplify the design of the focusing coil. For example, in the device shown in the drawing with four multiplying grids the field strength of the coil C may be 500 Gauss and the potential differences and the spacing between the electrodes may be as follows:

| Stage | p | q | $\Delta V$ | $\Delta x$ |
|---|---|---|---|---|
| 1 |  | 1 | 300 | 0.37 |
| 2 | 1 | 2 | 535 | 1 |
| 3 | 1 | 3 | 300 | 1.1 |
| 4 | 1 | 2 | 535 | 1 |
| 5 | 3 | 4 | 6,270 | 6.7 |

It will not in most cases be necessary to provide for refocusing over more than two stages at a time, because with a gain of only 2.5 per stage with the grid intercepting 0.5 of the current, the ratio of focused/unfocused current in the third stage would already be of the order of 20:1 and hence the unfocused fraction of the current would be negligible.

It may be possible to dispense with focusing in the last stage and to reduce $\Delta x_5$ to 0.5 cm., thereby saving 6 cm., in length of the system. The circle of chromatic confusion introduced by the last stage would, however, be increased from $4.5 \cdot 10^{-3}$ mm. to 0.35 mm.

The above statements and formulae are based on elementary considerations and it is found in practice that discrepancies arise between experimental results and the results to be expected from the formulae above given. These discrepancies are due to the fact that the emissive energies of the secondary electrons are not negligibly small and give rise to two kinds of aberration, namely, spherical aberration due to the angular distribution of emissive velocities of the electrons with constant emissive energy and chromatic aberration due to the statistical distribution of emissive energies. Consequently, all electrons emitted from a point are not refocused to a point, although as is to be expected, there is a disc of least confusion.

It is found that in order to reduce the discrepancies above mentioned, it is necessary to introduce correction factors into the Equations 1 and 2 above, which take into consideration the emissive energies of the secondary electrons. It is found that the relative values of the potentials to be applied to the electrodes and the spacing between the electrodes when taking into consideration the emissive velocities of the secondary electrons is as follows:

The equation corresponding to Equation 1 above is $$\frac{\Delta V}{\Delta U} = \frac{4}{\left(\frac{q}{p}-\frac{p}{q}\right)^2}\left(1+0.645\frac{q^2(q-p)v}{p^3(q+p)\Delta U} - \frac{1.135q^2}{p(q+p)}\sqrt{\frac{v}{\Delta U}}\right) \quad (3)$$

In this equation the significance of the characters is as described above and $v$ is the most probable emissive energy in electron-volts. If the electrons from the previous stage have negligibly small emissive energy, if they are, for instance, photo-electrons, the ratio of the potential differences of successive electrodes is $$\frac{\Delta V}{\Delta U} = \frac{4}{\left(\frac{q}{p}-\frac{p}{q}\right)^2}\left(1-1.135\left(\frac{q}{p}+\frac{p}{q}\right)\sqrt{\frac{v}{\Delta U}}\right) \quad (4)$$

These Equations 3 and 4 show that the potential ratio of successive stages no longer depends on $p$ and $q$ only but also on the ratio $v/\Delta U$. They are based on the assumption that the distribution of emissive energies of the secondary electrons closely approximates the Maxwellian distribution for low velocities.

The spacing $\Delta x$ in centimetres between two adjacent electrodes corresponding to Equation 2 above is $$\Delta x = \frac{10.57q\sqrt{\Delta V}}{H}\left(1+1.13\frac{v}{\Delta V}\right) \quad (5)$$

In the first stage where the primary photo-electrons are supposed to be emitted with negligibly small energies, i. e., $v=0$, this equation is of course reduced to Equation 2 above. With the revised formulae taking into consideration the emissive velocities of the electrons an example of a device with three multiplying grids and in which the field strength of the coil C is 300 Gauss and in which $v$ is taken as 1.2 electron-volts, th potential differences and the spacing between the electrodes may be as follows:

| Stage | p | q | ΔV | Δx |
|---|---|---|---|---|
| 1 | | 1 | 490 | 0.78 |
| 2 | 1 | 2 | 796 | 2.08 |
| 3 | 1 | 3 | 400 | 2.25 |
| 4 | 2 | 3 | 2180 | 5.07 |

I claim:

1. An electron multiplier picture tube comprising an elongated envelope having therein a photo-sensitive cathode at one end, a target electrode at the other end, a plurality of secondary electron emissive grid electrodes substantially adjacent said photosensitive cathode and spaced from the said target electrode, and magnetic field producing means substantially surrounding and extending longitudinally of the envelope for a distance substantially coextensive with the distance separating the photosensitive cathode and the target, said field producing means being adapted when electrically energized to develop a substantially axially symmetrical homogeneous magnetic field along the axis of and throughout said envelope.

2. An electron multiplier picture tube comprising an elongated envelope having therein a photosensitive cathode at one end, a target electrode at the other end, a plurality of substantially parallelly positioned secondary electron emissive electrodes substantially adjacent and parallel to said photosensitive cathode and spaced from and parallelly positioned relative to the target electrode, said secondary electron emissive grid electrodes being unequally spaced from each other, and magnetic field producing means substantially surrounding and extending longitudinally of the envelope for a distance substantially coextensive with the distance separating the photosensitive cathode and the target, said field producing means being adapted when electrically energized to develop a substantially axially symmetrical homogeneous magnetic field along the axis of and throughout said envelope.

3. An electron multiplier picture tube comprising an elongated envelope having therein a photosensitive cathode at one end, a target electrode at the other end, a plurality of secondary electron emissive grid electrodes substantially adjacent said photosensitive cathode and spaced from the said target electrode, and magnetic field producing means substantially surrounding and extending longitudinally of the envelope for a distance substantially coextensive with the distance separating the photosensitive cathode and the target, said field producing means being adapted when electrically energized to develop a substantially axially symmetrical homogeneous magnetic field along the axis of and throughout said envelope, and terminal connections to all of said electrode members for applying energizing potentials thereto.

HANS GERHARD LUBSZYNSKI.